(12) United States Patent
Morita

(10) Patent No.: US 6,695,702 B2
(45) Date of Patent: Feb. 24, 2004

(54) PROGRAM EXECUTION SYSTEM, PROGRAM EXECUTION DEVICE, RELAY DEVICE, AND RECORDING MEDIUM

(75) Inventor: Toru Morita, Tokyo (JP)

(73) Assignee: Sony Computer Entertainment Inc., Tokyo (JP)

(*) Notice: Subject to any disclaimer, the term of this patent is extended or adjusted under 35 U.S.C. 154(b) by 232 days.

(21) Appl. No.: 09/873,707

(22) Filed: Jun. 4, 2001

(65) Prior Publication Data

US 2002/0006824 A1 Jan. 17, 2002

(30) Foreign Application Priority Data

Jun. 7, 2000 (JP) ........................... 2000-171122
May 16, 2001 (JP) ........................... 2001-147056

(51) Int. Cl.[7] ............................. A63F 13/12; H04H 1/08
(52) U.S. Cl. ............................. 463/41; 455/557
(58) Field of Search ............... 463/40, 41; 455/556–559

(56) References Cited

U.S. PATENT DOCUMENTS 5,903,849 A * 5/1999 Selin et al. ................. 455/557
6,154,788 A * 11/2000 Robinson et al. ............... 710/8

FOREIGN PATENT DOCUMENTS

| DE | 299 18 148 U1 | * | 2/2000 | .......... G06F/19/00 |
| EP | 0 097 311 A1 | | 1/2000 | |
| JP | 9-261359 | * | 10/1997 | .......... H04M/11/00 |
| JP | 11-19337 | | 1/1999 | |
| JP | 11-333141 | | 12/1999 | |
| JP | 2000-115303 | | 4/2000 | |

* cited by examiner

*Primary Examiner*—Andrew M. Dolinar
(74) *Attorney, Agent, or Firm*—Katten Muchin Zavis Rosenman

(57) ABSTRACT

Entertainment system main body is connected via a relay device to an "i-mode" portable telephone system using a controller connection connector or external memory insertion connector provided on entertainment system main body. This relay device has the function of coordinating the software and hardware of the entertainment system and the portable telephone system. Entertainment system main body connected to an i-mode portable telephone system makes it possible, using existing infrastructure and with no major design changes, to effect the purchase, exchange, and interaction, etc. of game data using an online service that the i-mode portable telephone system has, such as site connection service, i-mode mail, and Internet connection.

22 Claims, 6 Drawing Sheets

Game Execution i-MODE

Game Execution

PROGRAM EXECUTION SYSTEM, PROGRAM EXECUTION DEVICE, RELAY DEVICE, AND RECORDING MEDIUM

FIELD OF THE INVENTION

This invention concerns a program execution system, program execution device, relay device, and recording medium that are suitable for application in an entertainment system by which, for example, one enjoys video games in a stand-alone mode or enjoys video games with various other players using a network.

BACKGROUND OF THE INVENTION

Heretofore in an entertainment system, the entertainment system has mainly a main body that executes programs such as video games, an operation device that outputs operation input by the user to the entertainment system main body, and a monitor device that displays images according to the execution of said programs.

In recent entertainment systems, a recording medium is used on which, for example, programs concerning video games are recorded, said programs are loaded from said recording medium into the entertainment system main body and are executed, and an optical disk such as a CD-ROM or DVD-ROM is employed as the recording medium. Thus it is possible to mount a music CD-ROM or a music CD on the entertainment system main body and enjoy music, or to mount a video DVD on it and enjoy a movie.

In such entertainment systems, it has been proposed that a connection be made with an information services provider (IP, for "information provider") and that various information be exchanged. In fields separate from such an entertainment system there has been a remarkable increase in recent years in the number of portable telephone sets in use. Thus technology for various types of systems that make use of portable telephones is progressing rapidly. For example, in the "i-mode" system offered by the Japanese telephone company NTT DoCoMo (registered trademark), portable telephone sets are connected to an i-mode center via a two-way wireless circuit (for example, a packet network or a PDC network), and connections with multiple information services providers can be made via an Internet circuit or dedicated circuit, allowing various information to be exchanged through portable telephone sets. Such portable telephone set corresponding to the i-mode system is sometimes called an i-mode portable telephone set.

If an entertainment system main body is connected to a system that makes use of portable telephones such as the aforesaid i-mode system (hereafter referred to simply as a "portable telephone system"), it is necessary to ensure that the data mode used by the portable telephone system and the data mode used by the entertainment system main body agree, and one can contemplate methods in which, for example, driver software is installed in the entertainment system main body.

However, in the connection with the portable telephone system, it is necessary that the driver software be permanently resident in the main memory of the entertainment system main body, which correspondingly decreases the memory region available for other programs and might make it impossible to process video games at high speed. Thus it is necessary to expand the capacity of the main memory or separately install a memory that temporarily stores the driver software just while it is not connected to the portable telephone system.

Also, in a portable telephone system, one can conceive of a method that modifies the data mode especially for the entertainment system main body, but this would require recalling the portable telephones that have been sold thus far and making a major design change, such as making a design change concerning data transmission and reception and redoing from the beginning the setting of efficient frequencies for data transmission and reception.

SUMMARY OF THE INVENTION

The purpose of this invention is to provide a program execution system, program execution device, relay device, and recording medium that will make it possible to simply connect to a portable telephone system an entertainment system main body that is principally for, for example, playing video games, and make it possible to expand the range of use of the entertainment system.

Another purpose of this invention is to provide a program execution system, program execution device, relay device, and recording medium that will make it possible to simply connect to a portable telephone system, for example, an entertainment system main body using existing infrastructure, with no major design changes.

The program execution system of this invention transmits data to the outside from a program execution device that executes programs, and it is constituted so as to have a relay device that is connected between said program execution device and a portable telephone set and converts the data from said program execution device and sends it to said portable telephone set. In this way, the data that is output from the program execution device can be changed in the relay device to the data mode that corresponds to the portable telephone system.

In such a situation, the relay device may be connected to an operation device connector of said program execution device, and the data from said operation device connector may be converted into data for said portable telephone set. Or, said relay device may be connected to an external memory connector of said program execution device, and the data from said external memory connector may be converted into data for said portable telephone set. If the program to be executed by said program execution device is a program for a video game, for example, then said converted data may be data concerning the characters who appear in the game.

Also, the program execution system of this invention is a program execution system that causes a program execution device that executes programs to receive data from outside, and it is constituted so as to have a relay device that is connected between said program execution device and a portable telephone set and converts the data from said portable telephone set and sends it to said program execution device. In this way, the data from the portable telephone system can be changed in the relay device to the data mode that corresponds to the program execution device. In such a situation, said relay device may be connected to an operation device connector of said program execution device, and the data from said portable telephone set may be converted into data corresponding to said operation device connector. Or, said relay device may be connected to an external memory connector of said program execution device, and the data from said portable telephone set may be converted into data corresponding to said external memory connector. Again, if the program to be executed by said program execution device is a program for a video game, said converted data may be data concerning the characters who appear in the game.

The program execution device of the present invention executes programs, and is constituted so as to transmit data to a portable telephone set via an operation device connector or to transmit data to a portable telephone set via an external memory connector. In this case, if the program to be executed by said program execution device is a program for a video game, said transmitted data may be data concerning the characters who appear in the game. Also, the program execution device of the present invention executes programs, and it is constituted so as to receive data from a portable telephone set via an operation device connector or to receive data from a portable telephone set via an external memory connector. In this case, if the program to be executed by said program execution device is a program for a video game, the received data may be data concerning the characters who appear in the game.

The relay device of the present invention is connected between a program execution device that executes programs and a portable telephone set, and it is constituted so as to convert the data that is output from said program execution device into data for a portable telephone set and send it to said portable telephone set. In this case, it may be connected to an operation device connector of said program execution device and may convert data from said operation device connector into data for said portable telephone set. Or it may be connected to an external memory connector of said program execution device and may convert data from said external memory device connector into data for said portable telephone set.

In addition, the relay device of the present invention is connected between a program execution device that executes programs and a portable telephone set, and it is constituted so as to convert the data that is output from said portable telephone set and send it to said program execution device. In this case, it may be connected to an operation device connector of said program execution device and may convert data from said portable telephone set into data corresponding to said operation device connector. Or it may be connected to an external memory connector of said program execution device and may convert data from said portable telephone set into data corresponding to said external memory device connector. Again, if said program to be executed is a program for a video game, said converted data may be data concerning the characters who appear in the game.

The recording medium of the present invention stores programs that are readable and executable by a program execution device, and on such medium is stored a program that has a step that transmits part of the data generated by execution of the program from an operation device connector to a portable telephone set. Also, the recording medium of the present invention stores programs that are readable and executable by a program execution device, and on such medium is stored a program that has a step that transmits part of the data generated by execution of said program from an external memory connector to a portable telephone set. In addition, the recording medium stores programs that are readable and executable by a program execution device, and on it is stored a program that has a step that receives data from a portable telephone set via an operation device connector. Furthermore, the recording medium stores programs that are readable and executable by a program execution device, and on it is stored a program that has a step that receives data from a portable telephone set via an external memory connector. Again, if the program to be executed by said program execution device is a program for a video game, the received data may be data concerning the characters who appear in the game.

DESCRIPTION OF THE PREFERRED EMBODIMENTS

Figure 1:
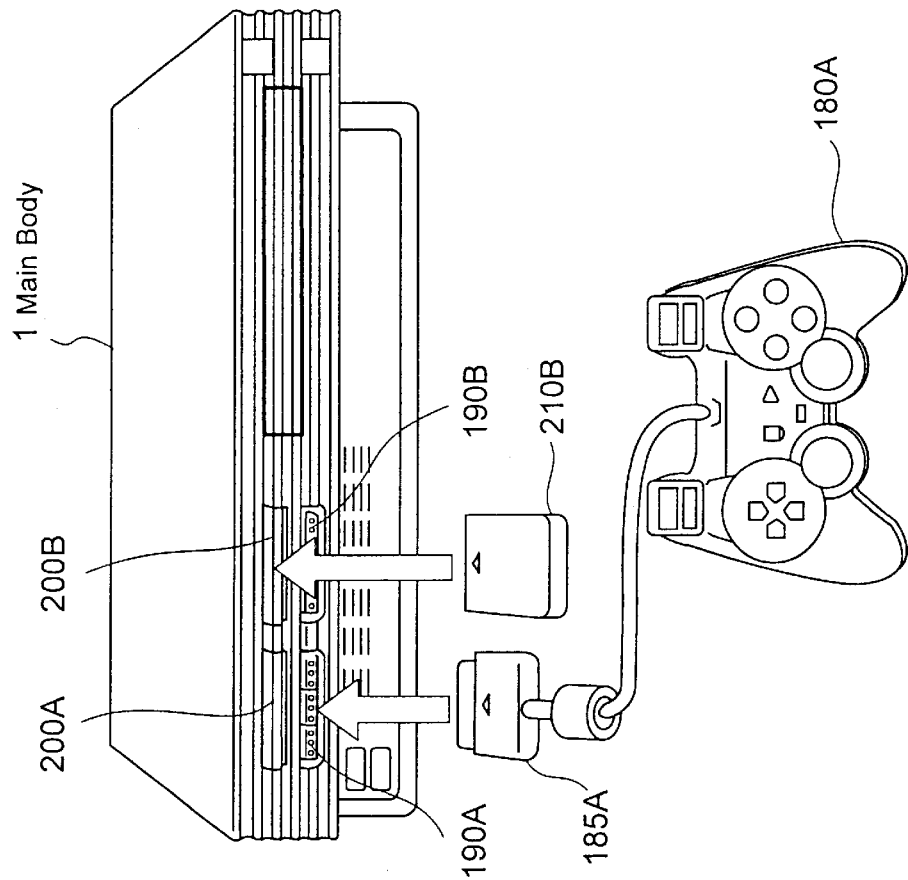
FIG. 1 is a rear view of the entertainment system main body that is an example of a program execution device.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

[Entertainment System]

FIG. 1 shows the rear view of entertainment system main body 1, which is an example of a program execution device, an operation device (hereafter called "controller") 180A, which is connected to part of this rear surface, and an external memory (hereafter called "memory card") 210B. Controller 180A has various operation buttons, such as direction keys made up of keys in a plus-sign pattern on top, bottom, left, and right, function setting operation buttons each labeled with four different representative symbols, and stick buttons to the left and right. By pressing these operation buttons at the appropriate times, the user (game player, etc.) can control the starting and playing of the game, reading and recording of data, etc. Memory card 210B is an external memory device having a memory capacity of, for example, 8 MB. Stored on memory card 210B, according to operation input by the user, is data concerning, for example, a video game stored in the main memory of entertainment system main body 1; alternatively, data concerning, for example, a video game stored on the memory card is transferred to the main memory of entertainment system main body 1.

Formed on the rear surface of entertainment system main body 1 are two memory card insertion openings 200A and 200B. Provided respectively inside these memory card insertion openings 200A and 200B are connector terminals (not pictured) for a one-piece connector, which is an external memory connector. Also, a printed circuit board (not pictured) is built into the insertion end side of memory card 210B, and a one-piece connector connection terminal pattern (not pictured) is formed thereon. Two memory cards 210A (not pictured) and 210B are inserted into these two memory card insertion openings 200A and 200B, respectively, and are connected to the circuitry of entertainment system main body 1 via the one-piece connectors.

Similarly, formed on the rear surface of entertainment system main body 1 are two controller terminals 190A and 190B. The female-side socket (not pictured) of a two-piece connector, which is an operation device connector, is provided for each of these controller terminals 190A and 190B. Provided on the connector 185 side of controller 180B is the male-side pin (not pictured) of a two-piece connector. The two controller connectors 185A and 185B (not pictured) are inserted respectively in these two controller terminals 190A and 190B, and controller 180 is connected to the circuitry of entertainment system main body 1 via said two-piece connectors. As described below, the entertainment system that is one example as a program execution system makes an i-mode connection or Internet connection using one or the other of the two memory card insertion openings 200A and 200B and the two controller terminals 190A and 190B.

Figure 2:
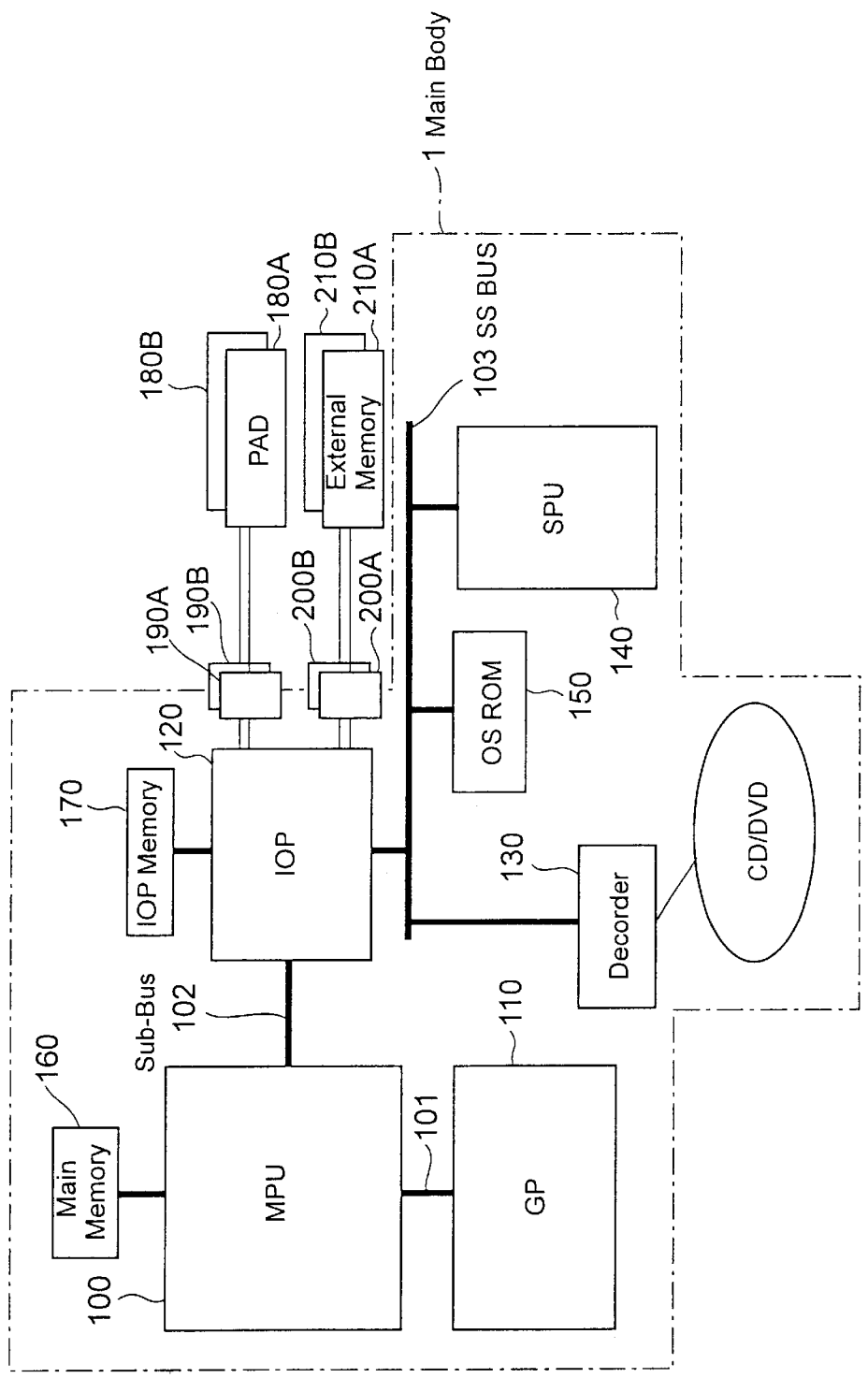
FIG. 2 is a block diagram showing the composition of the entertainment system shown in FIG. 1.

FIG. 2 is a block diagram showing the composition of the entertainment system shown in FIG. 1. This entertainment system has microprocessor unit (MPU) 100, graphic processor (GP) 110, input-output processor (IOP) 120, compact disk/digital video disk (CD/DVD) decoder 130, sound processing unit (SPU) 140, operating system ROM (OS-ROM) 150, main memory 160, and IOP memory 170. MPU 100 and GP 110 are connected by dedicated bus 101. MPU 100 and IOP 120 are connected by bus 102, which is called the sub-bus (SBUS). Also, IOP 120, CD/DVD decoder 130, SPU 140, and OS-ROM 150 are connected by bus 103, which is called the SSBUS (the bus below the sub-bus). Main memory 160 is connected to MPU 100, and IOP memory 170 is connected to IOP 120. Controller (PAD) 180 is also connected to IOP 120.

MPU 100 is the main CPU of this entertainment system. MPU 100 performs the prescribed processing by executing programs loaded into main memory 160 from a program stored in OS ROM 150 or, for example, an optical disk such as a CD-ROM or DVD-ROM. GP 110 is a graphic processor that has the function of rendering in this entertainment system. GP 110 performs drawing processing according to instructions from MPU 100. IOP 120 is an input-output processor that controls the exchange of data between MPU 100 and peripheral devices (CD/DVD decoder 130, SPU 140, etc.). CD/DVD decoder 130 reads data from a CD-ROM or DVD-ROM, etc. and transfers it into main memory 160. SPU 140 is a sound playback processor; based on sound generation commands from MPU 100, etc., it reproduces at the prescribed sampling frequency compressed waveform data stored in a sound buffer (not pictured). OS-ROM 150 is a ROM in which are stored programs to be executed by MPU 100 or IOP 120 when entertainment system main body 1 is turned on, etc. The data codes shared by MPU 100 and IOP 120 and the data codes especially for various processors are stored separately in OS-ROM 150.

Stored in main memory 160 are commands to be executed by MPU 100 and data, etc. to be used by MPU 100. Stored in IOP memory 170 are commands to be executed by IOP 120 and data, etc. to be used by IOP 120. Controller (PAD) 180 is an interface that, during execution of a video game, etc. conveys to entertainment system main body 1, via operation device connector 190, the intentions of the player. Memory card 210, which is an external memory, saves or loads data concerning video games via external memory connector 200 in correspondence with the operation of controller 180.

[i-Mode]

Next, we describe the i-mode that is used in this embodiment.

The portable telephone system called "i-mode" is a system that allows one to make use of site (program) connection services, look up telephone numbers, and make use of i-mode mail, Internet connection, and other online services using the display on a portable telephone set; it is a service provided by, for example, the telephone company NTT DoCoMo (registered trademark). An i-mode center is connected between the i-mode portable telephone set and the IP (information services provider). In i-mode, because packet communication is used, the communication fee is calculated on the basis of the volume of data that is sent and received rather than on the duration of the call.

In site (program) connection service, various online services provided by the IP (information services provider) can be used, such as checking bank balances, transferring bank funds, and looking up telephone numbers. Here a "site" means a program provided by an IP. And i-mode mail allows not only exchanges between fellow i-mode subscribers but also exchanges by e-mail over the Internet. With an Internet connection, upon directly inputting the address of the website one wants to see on one's i-mode portable telephone set, a connection is made to the Internet, and one can view the website.

The i-mode service is provided by the telephone company NTT DoCoMo, and similar services are provided by other telephone companies as well. For example, the telephone company J-PHONE provides the service SkyWalker E-mail, the telephone company Tu-Ka (registered trademark) and Digital Tu-Ka provides SkyMessage E-mail, and the telephone company IDO DDI Cellular Group provides the service cdmaOne Mail, all of which can execute e-mail via the Internet. Therefore this embodiment is not limited to i-mode but can also be used for any portable telephone system that allows such Internet connections.

The present invention contemplates specific means to use, in an entertainment system, an i-mode system that allows site connection service by connection with such various IPs, allows i-mode mail, and allows Internet connection.

[Connection between Entertainment System and Portable Telephone System]

Figure 3A:
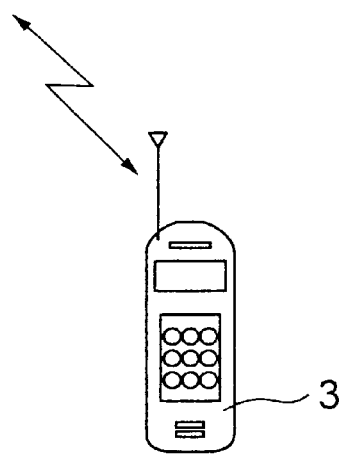
FIG. 3A is a conceptual view in which a portable telephone set is in two-way communication with an i-mode center using an antenna.
Figure 3B:
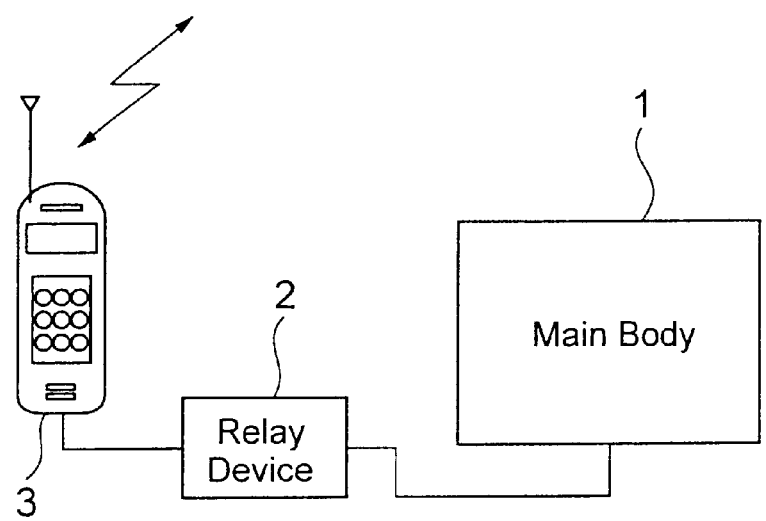
FIG. 3B is a diagram showing an example of the connection between a portable telephone set and the entertainment system main body.

FIG. 3A illustrates one such system, in which a portable telephone set 3 carries out two-way communication with an i-mode center using an antenna. FIG. 3B illustrates an example of the connection between this portable telephone set 3 and entertainment system main body 1. The external connection terminal of portable telephone set 3 and relay device (adaptor) 2 are connected, and the relay device 2 and entertainment system main body (for example, a video game device main body) 1 are connected.

Either the two connectors 190A and 190B, which are provided for controller connection, or the two openings 200A and 200B, which are provided for memory card connection, may be used for making the connection to entertainment system main body 1. Although not pictured, controller 180 is connected to controller insertion opening 190A or 190B, to which relay device 2 is not connected, and by operating the operation buttons of this controller 180, operation control is done such as characters and cursors displayed on the screen of the monitor device, which is not pictured. For the operation of communication control, this is done using the operation buttons of portable telephone 3.

Relay device 2, which connects video game device main body 1 with portable telephone 3, has the function of coordinating the differences between the specifications of the external connection terminal of portable telephone 3 and the specifications of the connector of video game device main body 1, as well as the differences in protocol of the two systems. In other words, there are two examples for relay device 2; with the first relay device designated hypothetically as 2A, one terminal part is connected to the external connection terminal of portable telephone set 3, and the other terminal part is connected with, for example, an operation device connector (two-piece connector) of entertainment system main body 1. And if data from entertainment system main body 1 is output through the operation device connector, the data from said operation device connector is converted into data for the portable telephone set and is sent to portable telephone set 3, and the data from portable telephone set 3 is converted into data corresponding to said operation device connector and is sent to the operation device connector.

On the other hand, with the second relay device designated hypothetically as 2B, one terminal part is connected to the external connection terminal of portable telephone set 3, and the other terminal part is connected with, for example, an external memory connector (one-piece connector) of entertainment system main body 1; if data from entertainment system main body 1 is output through the external memory connector, the data from the external memory connector is converted into data for the portable telephone set and is sent to portable telephone set 3, and the data from portable telephone set 3 is converted into data corresponding to said external memory connector and is sent to the external memory connector.

Figure 4:
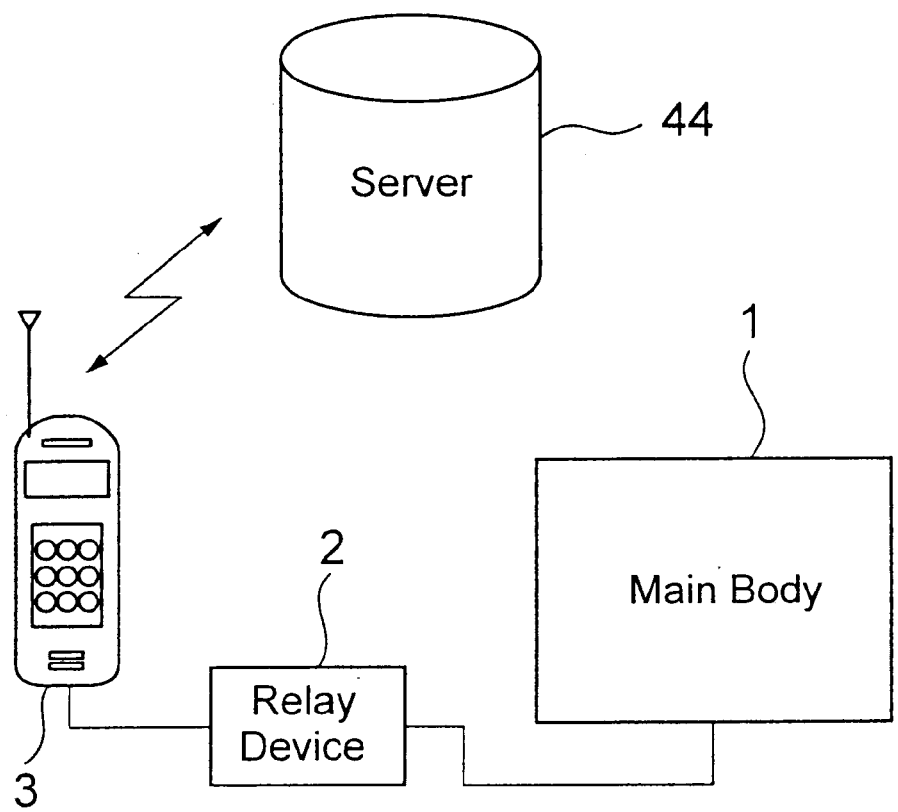
FIG. 4 is a diagram showing the first embodiment, which uses i-mode site connection service, in an entertainment system that consists of the portable telephone, relay device, and game device main body explained in FIG. 3B.

FIG. 4 illustrates a first embodiment in which i-mode site connection service is used in an entertainment system consisting of portable telephone 3, relay device 2, and game device main body 1, which were explained in aforesaid FIG. 3B. Such embodiment shows a system in which the desired data is taken in from server 44, which is a site, or the data is transmitted to server 44. Stored in server 44 are programs for, for example, the desired video game, and data for, for example, characters in specified video games (character image data and action data files), etc. With the system in FIG. 4, one can purchase (read) video game software and store and read data for the user's own character. With this first embodiment, it is simple to connect to a portable telephone system the entertainment system main body 1 mainly for enjoying, for example, video games, and the range of use of the entertainment system can be expanded. And because it suffices merely to connect relay device 2 between portable telephone set 3 and entertainment system main body 1, by making use of the existing infrastructure, and with no major design changes, entertainment system main body 1 can be connected to a portable telephone system that makes use of i-mode site connection services.

Figure 5:
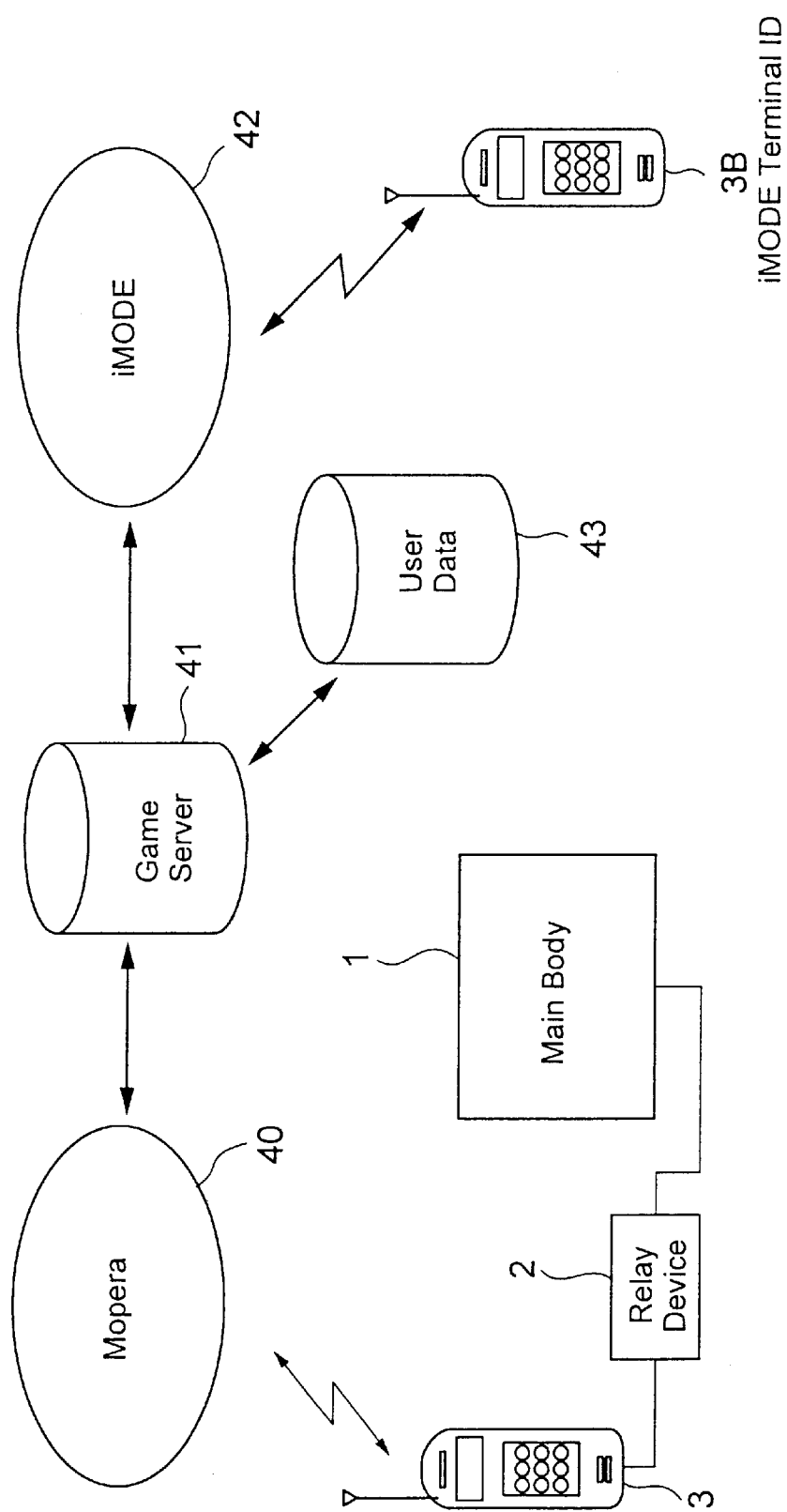
FIG. 5 is a diagram showing the second embodiment, which uses i-mode mail, in an entertainment system that consists of the portable telephone, relay device, and game device main body explained in FIG. 3B.

FIG. 5 illustrates a second embodiment in which i-mode mail is used in an entertainment system consisting of portable telephone 3, relay device 2, and game device main body 1, which were explained in aforesaid FIG. 3B. In such embodiment, an entertainment system consisting of portable telephone 3, relay device 2, and game device main body 1 is preferably connected via a wireless two-way communication circuit to mopera (mobile operation radio assistant) 40, which is a type of provider. Mopera 40 is connected to game server 41, allowing programs and data concerning video games stored here to be exchanged with mopera 40. Programs and data concerning video games may be general programs and data for various types of game software. Game server 41 is connected to user data file 43, and data can be exchanged with game server 41. User data file 43 is data prepared, etc. in whole or in part by the user with respect to the game software; it contains, for example, data on characters prepared according to user preferences (character image data and action data file), data up to when the playing of a specified game was interrupted, data on racing cars in racing games, and fighting data on opponents in competitive games. Therefore with this second embodiment, in addition to the services of the first embodiment in FIG. 4, video game data in which multiple game players participate can be exchanged with each other, and competitive games and role-playing games with multiple users can be enjoyed.

With i-mode 42, of course the aforesaid ordinary i-mode services can be received using an i-mode portable telephone set 3B. A user whose i-mode portable telephone set 3B has been registered can enjoy an entertainment system that makes use of i-mode by connecting relay device 2 and game device main body 1 to his portable telephone set 3B, without any new registration. In this way, if the user of game device main body 1 and the user of portable telephone set 3B are the same, it may be made so that registration can be made in user data file 43 with a correspondence made between the ID of portable telephone set 3B (the i-mode terminal ID) and the user ID. In this way, for example, individual data sent from game device main body 1 via mopera 40 to game server 41 can be confirmed by portable telephone set 3B whose ID matches, and vice-versa. Or a game whose execution has been interrupted by game device main body 1 can be resumed by portable telephone set 3B.

With this second embodiment, as with the first embodiment described above, the range of use of an entertainment system can be expanded, and by using the existing infrastructure, with no major design changes, entertainment system main body 1 can be connected to a portable telephone system that uses i-mode site connection services.

Figure 6:
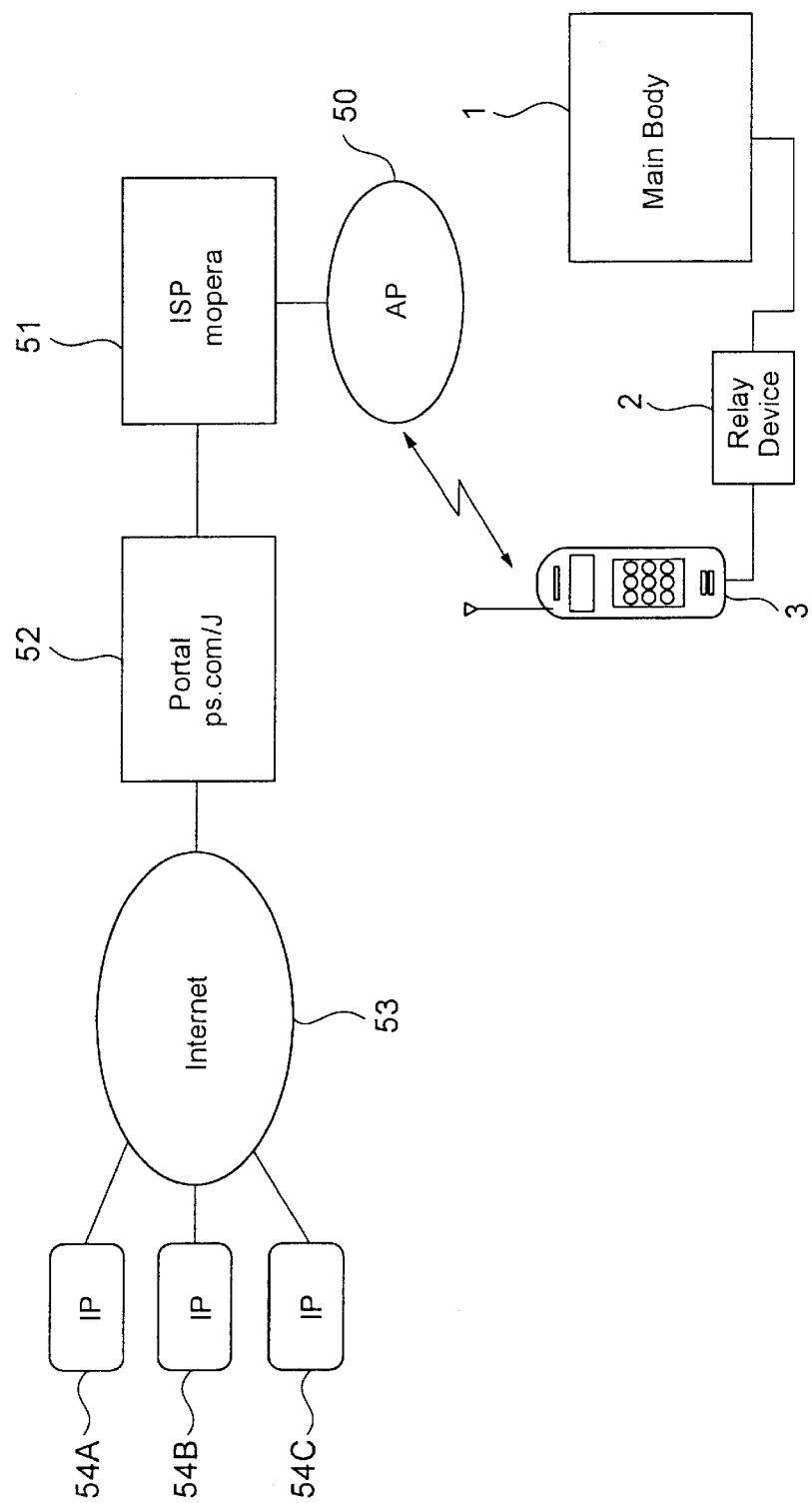
FIG. 6 is a diagram showing the third embodiment, which uses the Internet, in an entertainment system that consists of the portable telephone, relay device, and game device main body explained in FIG. 3B.

FIG. 6 illustrates a third embodiment, which uses the Internet, in an entertainment system that consists of portable telephone 3, relay device 2, and game device main body 1 explained above in FIG. 3B. The entertainment system of this embodiment is connected to A-profile (AP: application profile) 50 via a wireless two-way communication circuit. AP 50 is connected to international standardized profile mopera (ISP mopera) 51. ISP mopera 51 is connected to Internet 53 via prescribed portal site (for example, Portal ps.com/J (the portal site of Playstation dot com Japan)) 52. A large number of information service providers (IPs) 54A–54C are connected to Internet 53. A feature of this system is that whereas i-mode is for a domestic standard, the Internet is a worldwide standard.

Therefore, with the entertainment system of this third embodiment, in addition to the services of FIGS. 4 and 5, the international nature of the Internet worldwide standard makes it possible to exchange game data with game players abroad, not just those in the same country. Also, using the existing infrastructure and without any major design changes, entertainment system main body 1 can be connected to a portable telephone system that uses the Internet. Programs and data to be executed by the entertainment system of the first through third embodiments can be stored and provided on a recording medium such as an optical disk.

This invention makes it simple to connect to a portable telephone system an entertainment system that is mainly for, for example, enjoying video games, and makes is possible to expand the range of use of entertainment systems.

Also, it makes it simple to, for example, connect an entertainment system main body to a portable telephone system using the existing infrastructure, with no major design changes.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

What is claimed is:

1. A program execution system that transmits data to the outside from a program execution device that executes programs, said program execution device having an operation device connector for connection of an operation device such as a controller, said program execution system comprising:

a portable telephone set, and
   a relay device connected between said operation device connector of said program execution device and said portable telephone set,
   wherein said program execution system converts data from said program execution device and sends it to said portable telephone set.

2. A program execution system as described in claim 1, wherein said relay device converts data from said operation device connector into data for said portable telephone set.

3. A program execution system as described in claim 1, wherein if the program to be executed by said program execution device is a program for a video game, then said convened data is data concerning characters of said video game.

4. A program execution system that causes a program execution device that executes programs to receive data from the outside, comprising:

a relay device that is connected between said program execution device and a portable telephone set, converts data from said portable telephone set, and sends it to said program execution device,
   wherein said program execution device further comprises an operation device connector for connection of an operation device such as a controller, and
   wherein said relay device is connected to said operation device connector.

5. A program execution system as described in claim 4, wherein said relay device converts data front said portable telephone set into data corresponding to said operation device connector.

6. A program execution system as described in claim 4, wherein if the program to be executed by said program execution device is a program for a video game, then said convened data is data concerning characters of said video game.

7. A program execution device that executes programs and has an operation device connector for connecting an operation device such as a controller, wherein said program execution device is adapted to transmit data to a portable telephone set via said operation device connector.

8. A program execution device as described in claim 7, wherein if said program is a program for a video game, then said transmitted data is data concerning characters of said video game.

9. A program execution device tat executes programs and has an operation device connector for connecting an operation device such as a controller, wherein said program execution device is adapted to receive data from a portable telephone set via said operation device connector.

10. A program execution device as described in claim 9, wherein if said program is a program for a video game, then said received data is data concerning characters of said video game.

11. A relay device connected between a program execution device that executes programs and a portable telephone set, said program execution device having an operation device connector for connection of an operation device such as a controller, said relay device comprising a first connector for connection to said portable telephone set and a second connector for connection to said operation device connector, wherein said relay device converts data that is output from said program execution device into data for the portable telephone set and sends it to said portable telephone set.

12. A relay device as described in claim 11, wherein said relay device is connected to said operation device connector of sand program execution device and converts data from said operation device connector into data for said portable telephone set.

13. A relay device connected between a program execution device that executes programs and a portable telephone set, said program execution device having an operation device connector for connection of an operation device such as a controller, said relay device comprising a first connector for connection to said portable telephone set and a second connector for connection to said operation device connector, wherein said relay device converts data that is output from said portable telephone set and sends it to said program execution device.

14. A relay device as described in claim 13, wherein said relay device is connected to said operation device connector of said program execution device and converts data from said portable telephone set into data corresponding to said operation device connector.

15. A relay device as described in claim 11, or 13, wherein if said program to be executed is a program for a video game, then said convened data is data concerning characters of said video game.

16. A recording medium on which is recorded a program that can be read and executed by a program execution device, said program execution device having an operation device connector for connection of an operation device such as a controller,
   wherein said program comprises a step that transmits pan of the data generated by execution of the program from said operation device connector to a portable telephone set.

17. A recording medium on which is recorded a program that can be read and executed by a program execution device, said program execution device having an operation device connector for connection of an operation device such as a controller,
   wherein said program comprises a step that receives data from a portable telephone set via said operation device connector.

18. A recording medium as described in claim 17, wherein if the program to be executed by said program execution device is a program for a video game, then said received data is data concerning characters of said video game.

19. A relay device for enabling communications between an entertainment device and a portable telephone, comprising:
- a first connector adapted for insertion into a handheld controller slot of an entertainment device, and
- a second connector adapted for physical connection to a portable telephone.

20. A relay device as described in claim 19, wherein said first and second connectors are wired together.

21. A program execution system for data communication with the outside from a program execution device that executes programs, said program execution device having a handheld controller slot for connection of a handheld controller, said program execution system comprising:
- a portable telephone, and
- a relay device connected between said handheld controller slot and said portable telephone set,
- wherein said program execution system enables data communication between said program execution device and said portable telephone set.

22. A program execution system as described in claim 21, wherein said relay device further comprises a first connector adapted for insertion into said handheld controller slot or said external memory slot and a second connector adapted for physical connection to said portable telephone.

* * * * *